United States Patent [19]

Chance

[11] Patent Number: 5,106,246
[45] Date of Patent: Apr. 21, 1992

[54] MOVABLE PLATFORM FOR STORING FREIGHT AND AUTOMOBILES

[76] Inventor: Martin D. Chance, 235 SW. LeJeune Rd., Miami, Fla. 33134

[21] Appl. No.: 625,247

[22] Filed: Dec. 10, 1990

Related U.S. Application Data

[63] Continuation-in-part of PCT/US89/01380, Apr. 4, 1989

[51] Int. Cl.⁵ ................................................. E04H 6/06
[52] U.S. Cl. ........................................ 410/26; 220/1.5; 410/10; 410/29; 414/229
[58] Field of Search ................ 410/13, 14, 16, 10, 410/24, 25, 26, 27, 29, 29.1; 414/229, 537; 220/1.5

[56] References Cited

U.S. PATENT DOCUMENTS

| | | |
|---|---|---|
| 2,165,376 | 7/1939 | Helmer .................................... 410/14 |
| 3,675,795 | 7/1972 | Dluhy . |
| 4,124,119 | 11/1978 | Nordstrom ......................... 410/13 X |
| 4,668,142 | 5/1987 | Fity . |
| 4,768,916 | 9/1988 | Gearin . |
| 4,797,049 | 1/1989 | Gearin . |
| 4,801,229 | 1/1989 | Hanada et al. ...................... 410/26 |
| 4,881,859 | 11/1989 | Ehrlich ............................... 410/29.1 |
| 4,911,590 | 3/1990 | Green .................................... 410/26 |
| 4,917,557 | 4/1990 | Kato et al. ......................... 410/13 X |
| 4,963,067 | 10/1990 | Gearin et al. ..................... 410/16 X |
| 4,966,510 | 10/1990 | Johnson, Jr. ...................... 410/24 X |
| 4,992,013 | 2/1991 | Westerdale ....................... 410/26 X |

FOREIGN PATENT DOCUMENTS

| | | | |
|---|---|---|---|
| 518839 | 11/1955 | Canada ................................. 410/26 |
| 1284610 | 12/1966 | Fed. Rep. of Germany . |
| WO81/01997 | 7/1981 | PCT Int'l Appl. .................. 410/24 |
| 1441396 | 6/1976 | United Kingdom ................. 410/24 |

*Primary Examiner*—Robert J. Spar
*Assistant Examiner*—Robert S. Katz
*Attorney, Agent, or Firm*—Sanchelima & Assoc.

[57] ABSTRACT

An apparatus for loading freight and automobiles inside maritime containers of substantially rectangular projection. Post assemblies are vertically mounted inside the container on a chassis assembly. A platform assembly is pivotally mounted to the post assemblies that are closer to the innermost end of the container. A forklift, or other lifting device, is utilized to lift and lower the other end of the platform and locking assemblies are used to maintain the platform in place, at a predetermined angle with respect to the plane of the chassis assembly and floor of the container. Front post assemblies are collapsably mounted so that the entire apparatus can be stored away in a volumetrically efficient manner. Ski and wheel members are mounted to the underside of the front of the chassis assembly to help the forklift in the transportation of the apparatus.

7 Claims, 7 Drawing Sheets

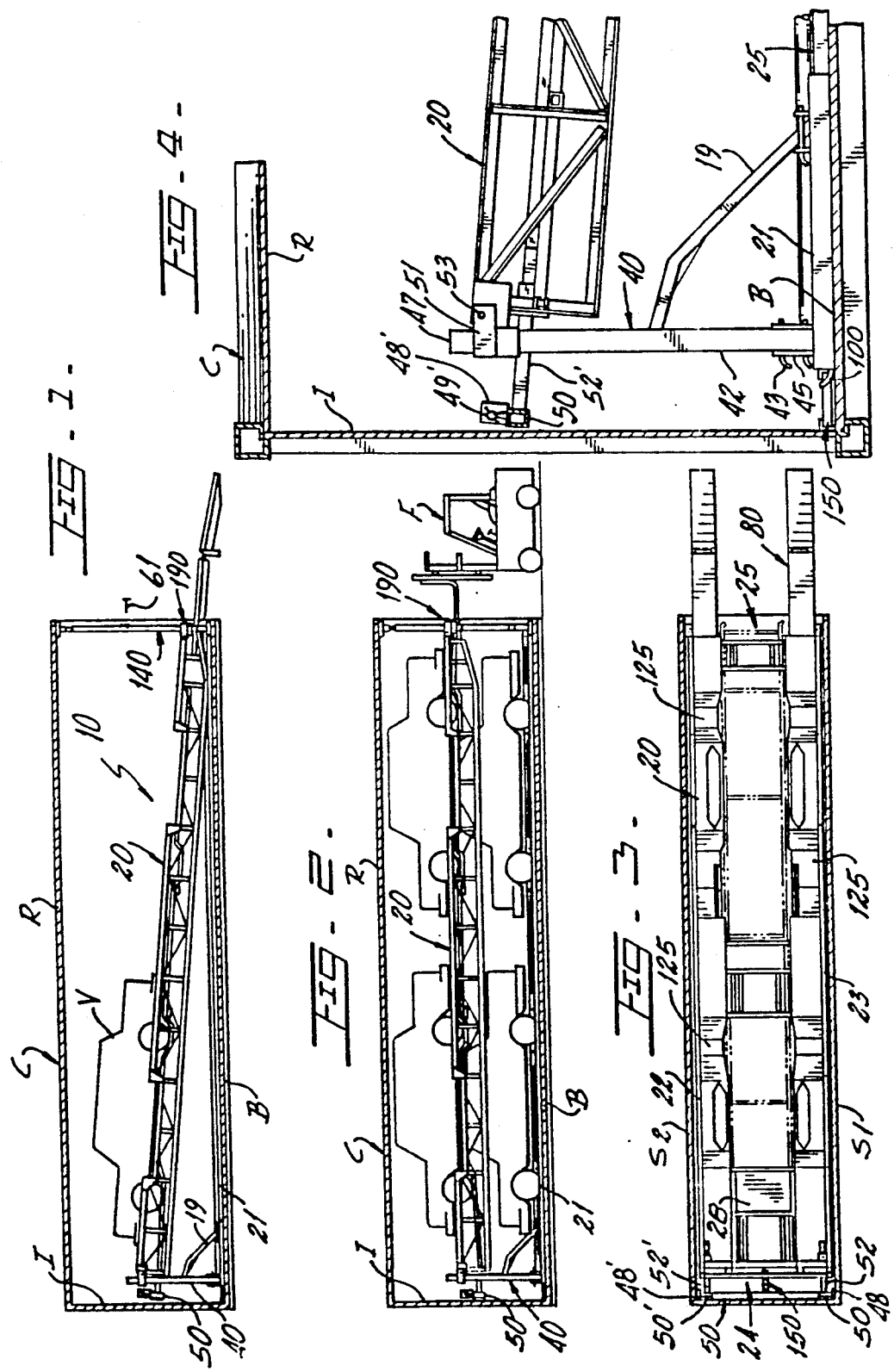

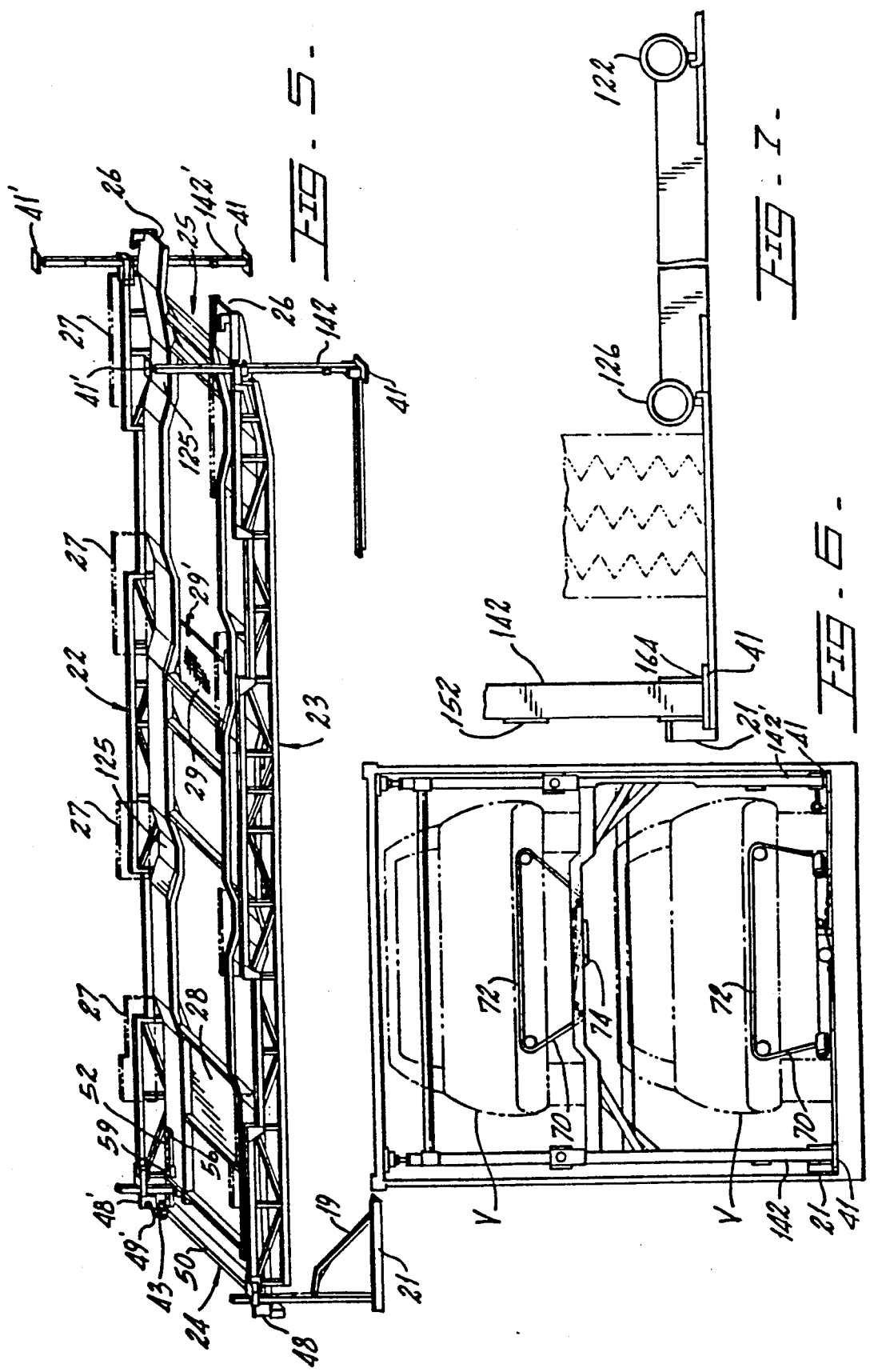

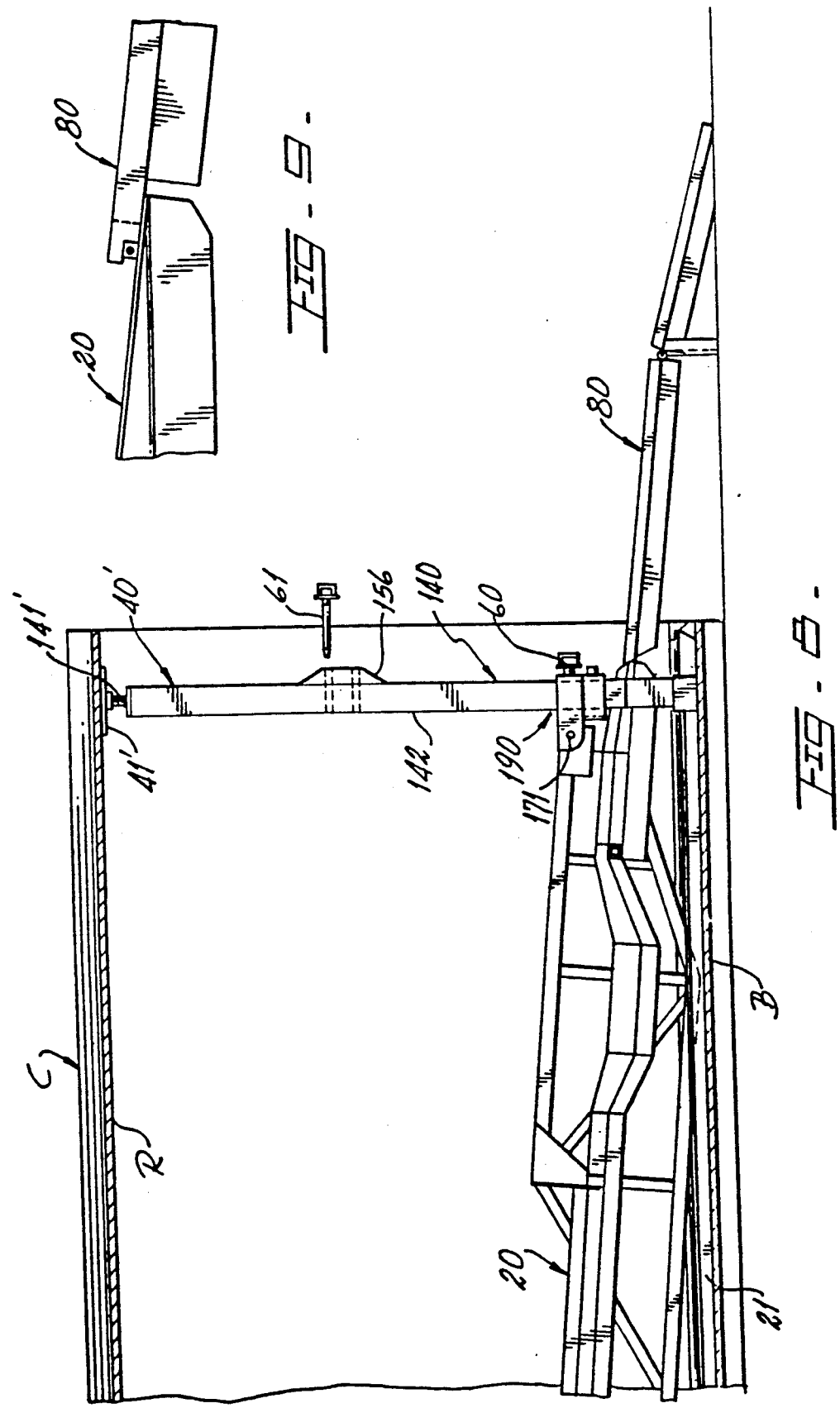

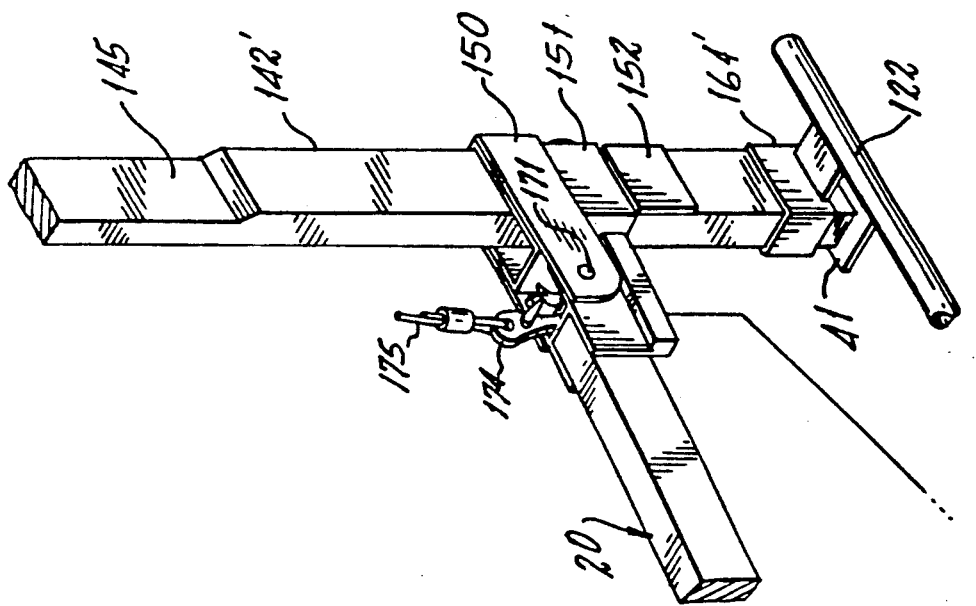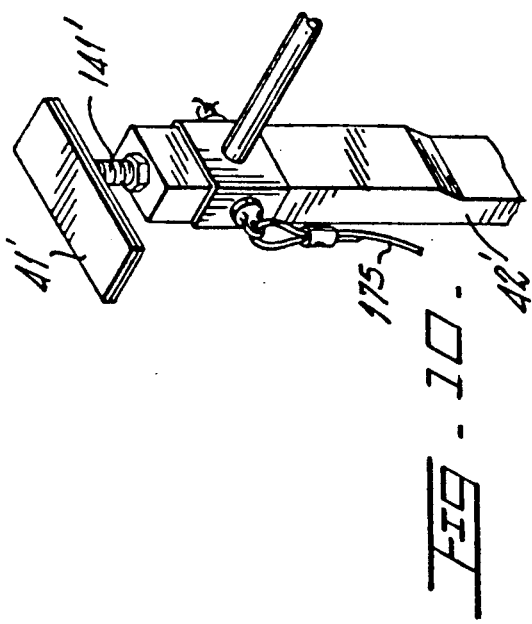

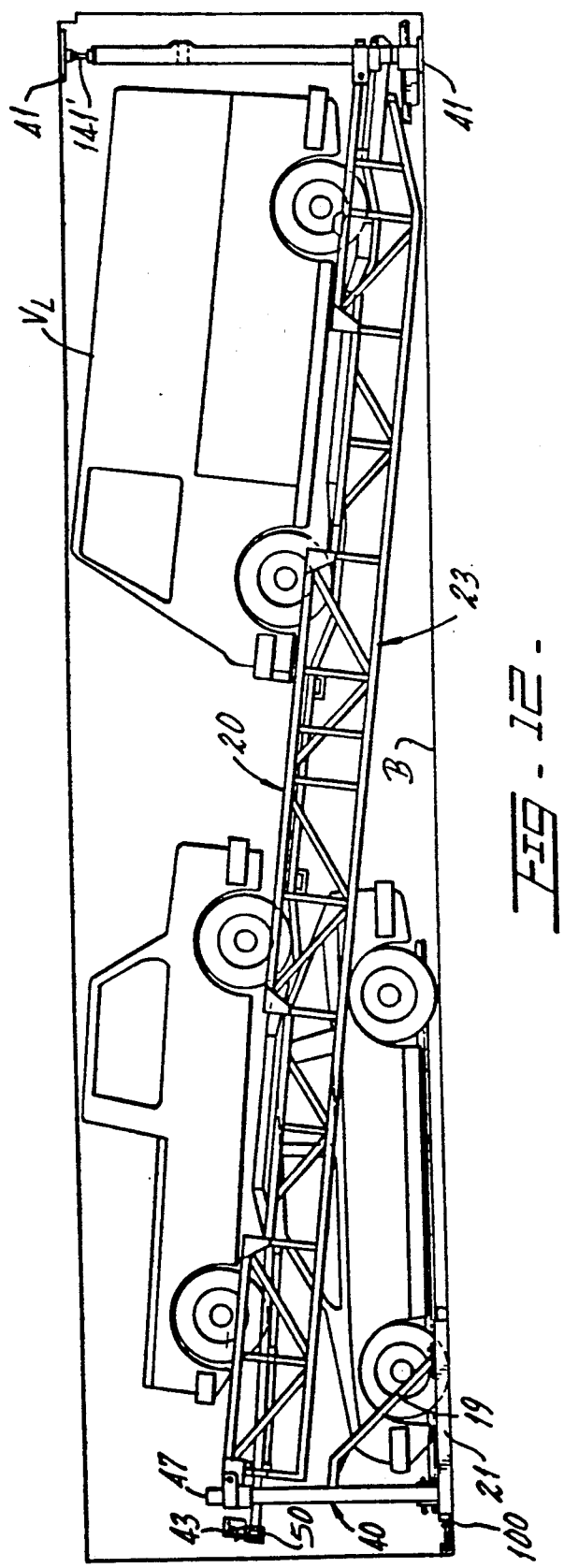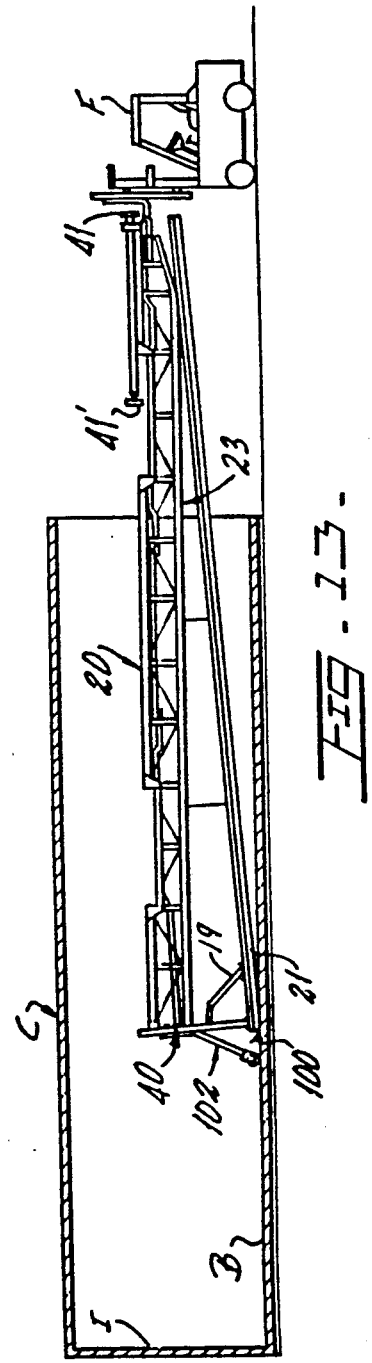

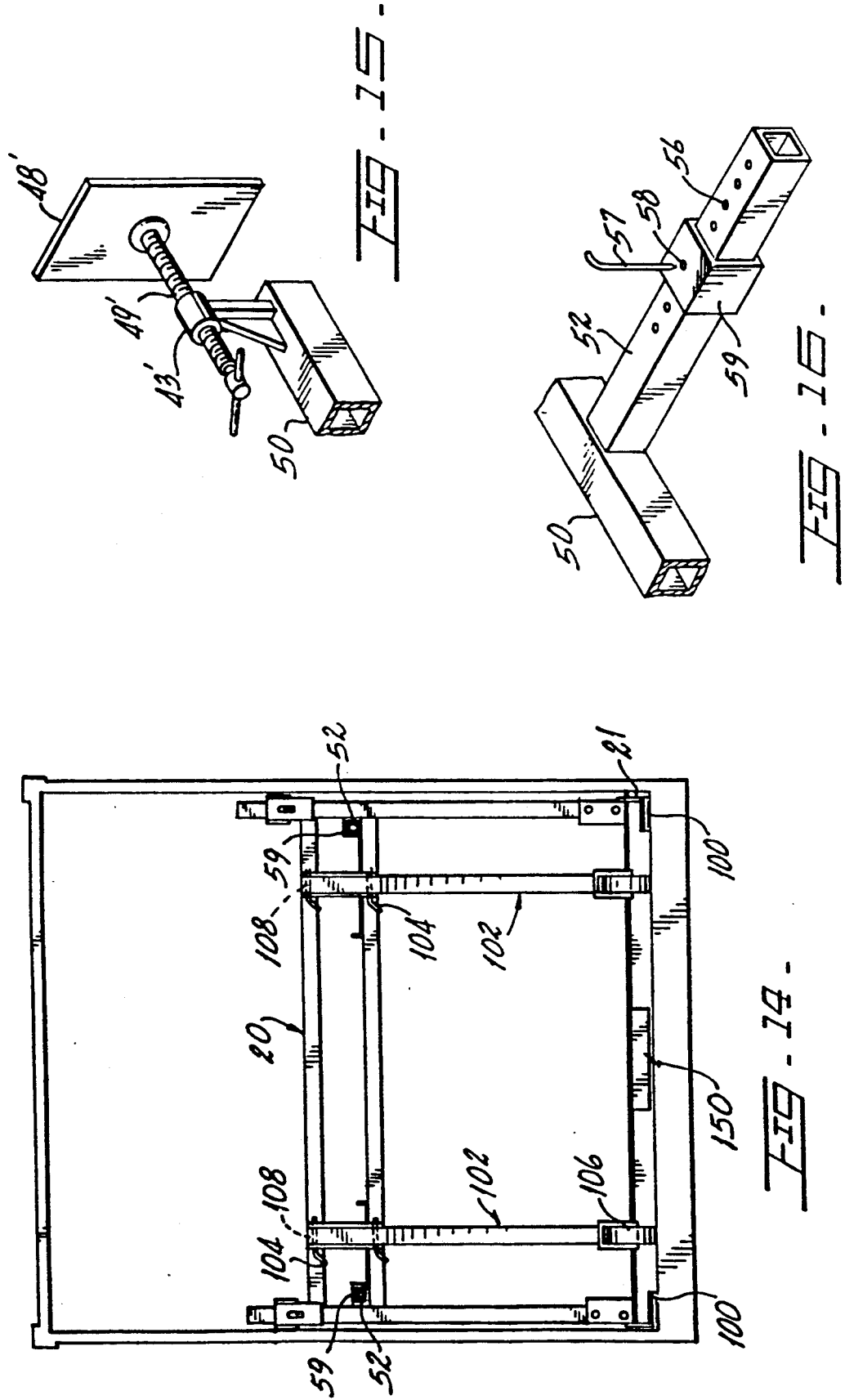

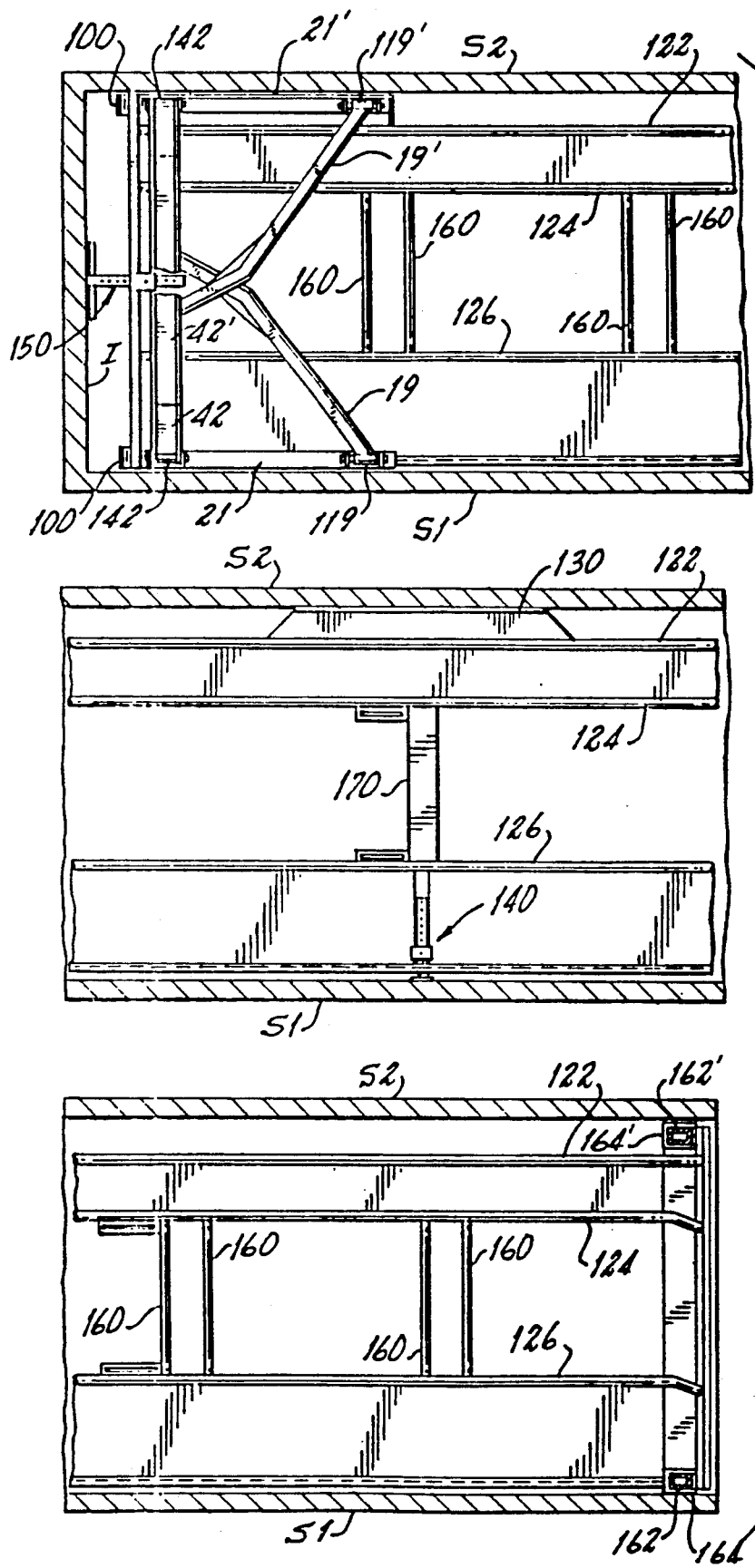

MOVABLE PLATFORM FOR STORING FREIGHT AND AUTOMOBILES

OTHER RELATED APPLICATIONS

The present invention is a continuation-in-part of pending PCT patent application Ser. No. PCT/US 89/01380, filed on Apr. 4, 1989, wherein the United States has been designated and elected.

BACKGROUND OF THE INVENTION

1. Field of the Invention

The present invention relates to an apparatus for readily storing freight and automobiles inside maritime containers.

2. Description of the Related Art

The closest prior art includes the above mentioned parent application which requires the use of removable jack assemblies for lifting the platform. It has been found in practice that this is a time consuming activity requiring an investment in said jack assemblies with the consequent maintenance and storage problems.

SUMMARY OF THE INVENTION

It is one of the main objects of the present invention to provide an apparatus for storing freight and automobiles that can readily load and unload its cargo safely in a minimum time.

It is another object of this invention to provide such an apparatus that can be lifted and lowered with the use of readily available forklifts or other lifting devices.

It is another object of this invention to provide such an apparatus that can be stored, when not in use, in a volumetrically efficient manner.

It is yet another object of this present invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents a side elevational view of the interior of a container equipped with the present invention with the first vehicle loaded and ready to accept the second vehicle.

FIG. 2 shows a side elevational view of the container shown in FIG. 1 with four automobiles loaded therein and showing where a forklift engages the platform for raising and lowering it when there are no vehicles in the lower level.

FIG. 3 illustrates a top view of the container shown in FIG. 2, without the automobiles, to schematically represent platform used in the preferred embodiment.

FIG. 4 is a representation of a partial elevational view of one of the vertical inner posts where a corner of the platform is pivotally mounted.

FIG. 5 illustrates an isometric view of the platform utilized in the present invention and the respective vertical post assemblies for each corner.

FIG. 6 is an end elevational view, as seen from the entrance to the container, showing two end vehicles secured for transportation.

FIG. 7 shows a magnified detailed view of the guard rail on floor of the container.

FIG. 8 is a partial elevational view of the lowered platform ready to admit vehicles for the upper level with the help of the ramp.

FIG. 9 shows a detail view of the engagement between the ramp and the platform.

FIG. 10 shows a detailed view, in isometric, of the upper end of the rear post assembly.

FIG. 11 depicts a partial isometric representation of the lower end of the rear post assembly shown in FIG. 8.

FIG. 12 illustrates how taller vehicles can be loaded in a container using the present invention for its maximum volumetric utilization.

FIG. 13 shows a platform assembly being transported from its storage site to the container where it is going to be utilized.

FIG. 14 is an end view from inside the container showing the wheel and ski assemblies mounted to the front end of the platform.

FIG. 15 is a detail view of the mechanism used in the preferred embodiment to transversally fasten the platform assembly in place.

FIG. 16 is a detail view of the mechanism used in the preferred embodiment to longitudinally fasten the platform assembly in place.

FIG. 17 shows a top view of the innermost, middle and outermost (entrance to the container) sections of the chassis assembly.

DETAILED DESCRIPTION OF THE PREFERRED EMBODIMENT

Referring now to FIGS. 1 through 3, where the present invention is generally referred to with numeral 10, it can be observed that it basically includes platform assembly 20, chassis assembly 25 with vertical supporting front and rear post assemblies 40 and 140 collapsably keeping assemblies 20 and 25 in a spaced apart relationship and locking assemblies 190 associated with each one of said rear post assemblies 140.

Platform assembly 20 extends substantially along the entire length of container C which is typically 12 meters in length. Container C has a substantially rectangular floor plan and include a floor, four top frame members, four bottom frame members and four corner container posts. Platform assembly 20 has substantially a rectangular projected shape with two lateral sides 22 and 23 longer than its two end sides 24 and 25, as best seen in FIG. 5. One of the end sides of platform 20 is denominated inner side 24 and it is pivotally mounted to the upper sections of front post assemblies 40 which are located substantially adjacent to the inner end wall I of container C. The other end side is denominated outer end side 25 of platform assembly 20 and includes pockets 26 that receive the fork member of conventional forklift F. In this manner, outer end side end 26 can be lifted and lowered by forklift F. Once in the desired position, it is locked in place on supporting rear post assemblies 140 and locking assemblies 190, which includes locking pin 60 and 61, as best seen in FIG. 8.

As seen in FIGS. 3 and 5, plates 48 and 48' are adapted to exert transversal forces against the container's side walls $S_1$ and $S_2$, thereby keeping inner side 24 of platform 20 rigidly in place. Plate 48 is mounted to one end of spacer member 50 through threaded shafts 49 and 49' which pass through built-in threaded pieces 43 and 43'. When shafts 49 and 49' are rotated: they cause plates 48 and 48' to move towards or away from side walls S₁ and S₂, as seen in FIGS. 3 and 15. Transversal member 50 is perpendicularly and rigidly mounted to slidable members 52 and 52' which cause elongated member 50 to travel towards and away from member 42 and locked in place through a locking mechanism which includes, in this preferred embodiment, tubular section 59 and pin 57 that is insertable through openings 56 and 58. Members 50 and 50' permit inner post assemblies 40 to be kept at a spaced apart relationship with respect to inner wall I.

FIG. 5 shows, primarily, platform assembly 20 suspended in a spaced apart relationship with respect to chassis assembly 25, which is partially shown. Also, shown in this figure are wheel well covers 27 that are hingedly mounted to wheel wells 125 of platform 20 so that the underside of vehicles that are low (Jaguars, Porches, etc.) can not come in contact with platform assembly 20. Also, by closing wheel wells 125 with covers 27, the inventor has been able to accommodate up to six smaller vehicles in a 12 meter container. In the preferred embodiment, wheel well covers 27 are rigidly mounted to platform assembly 20 and in cooperative arrangement to cover wheel wells 125 when lowered. Oil pan 28 is intended to collect any possible leaking oil from a vehicle loaded on the inner end of platform 20 and the same function is intended for spring loaded rolled sheet 29 that includes hook 29' to keep it in distension.

In FIG. 6, a rear view shows how vehicles V are secured to platform 20 through fastening mechanisms 70. Fastening mechanism 70 includes a flexible cord or band 72 preferably made of a nylon material that is passed through a fixed point in platform assembly 20. Ratchet assembly 74 permits the tight adjustment of band 72 forcing vehicle V downward.

One of the front post assemblies 40 is shown in greater detail in FIG. 4. Front elongated post member 42 extends vertically from lower longitudinal chassis member 21 of chassis assembly 25 to slightly more than one half of the height of roof R with respect to bottom B. The lower end of member 42 is pivotally and perpendicularly secured to structural member 21, as best seen in FIG. 4; 5 and 17. The upper end 47 of member 42 is pivotally and removable secured platform assembly 20 through upper C-shape plate 51 and removably to pin 53. When apparatus 10 is in use, post member 42 is vertically disposed through the action of lower C-shape plate 45 and pins 43. Reinforcing member 19 is designed to counteract any load forces and it is also pivotally mounted to member 21 of chassis assembly 25.

The other side of chassis assembly 25 includes member 21' that extends longitudinally like member 21 but not the entire length. Member 21' is rigidly mounted to tire guiding member 122 that extends longitudinally the entire length of the container. Spacer member 130 is rigidly mounted to tire guiding member 122, approximately around its center, and co-acts with adjustable space mechanism substantially opposite to member 130. Tire guiding members 122, 124 and 126 insure that vehicle V is parked in the right place while at the same time it provides a structural function to the chassis assembly. Spacer mechanism 140 insures, with member 130, that the chassis assembly 25 does not move around during transportation. Another spacer mechanism 150 mounted to chassis assembly 25 keeps the latter at a predetermined spaced apart relationship with respect to inner wall I.

In FIG. 7, the relative position of a tire of vehicle V loaded on chassis assembly 20 is shown. Also, rear post member 162 is received by rear C-shape member 164 that is, in turn, rigidly mounted to lower longitudinal structural member 21.

FIG. 8 shows an elevational view of the rear portion of platform assembly 20 in its lowered position and ramp assembly 80 mounted thereon. Rear post assembly 160 includes rear elongated post member 162 that extends vertically from roof R down to bottom surface B of container C. The lowermost end of member 162 rests on plate 41 that in turn rests on bottom surface B, as best seen in FIGS. 6, 7 and 11. The upper end of members 162 include plates 41' that are adjustable along the longitudinal axis of member 162 through rotation of threaded pin 141', as best seen in FIGS. 8 and 10. A portion 145 in member 162 has been reduced in width to facilitate avoiding contact with the exterior mirrors of automobiles that are loaded and unloaded from container C.

FIG. 9 shows in greater detail the engagement of ramp assembly 80 with platform assembly 20. Basically, this engagement is intended to effectively prevent the separation of these two assemblies when the vehicles are loaded and unloaded from platform assembly 20.

Also, in FIG. 11, we can see that when platform 20 is lowered then lower portion 151 of guiding loop 150 rests on stopper member 152 that further insures that platform 20 will not be lowered past a predetermined point. Stopper member 152 is, in the preferred embodiment, rigidly mounted to a predetermined position at the lower end of member 162 so that platform 20 does not come in contact with the bottom. This is desirable because only the corners will carry the stress and weight of the vehicles. Guiding loop 150 has a limited pivotal movement and it is enough to permit its alignment with protruberance 156 and insertion of pin 161. As another safety feature, hook 174 can be removably hooked to pin 171. Hook 174 is rigidly attached to steel wire 175 on one end and the other end of steel wire 175 can be tied to a fixed position, such as shown in FIG. 10. In the event that the lifting device (forklift) does not function properly when the platform is being raised or lowered, steel wire 175 can withstand the weight of platform assembly 20, at least temporarily, thereby preventing an accident.

In FIG. 12, a rather large vehicle $V_L$ is shown occupying the space of tow vehicles and this is accomplished by leaving platform assembly 20 down. After the vehicles loaded on platform assembly 20 are unloaded, the vehicle on the left on bottom surface B is unloaded after platform assembly 20 is lifted and locked in place.

In FIG. 13, it can be seen how forklift F hauls platform assembly 20 that includes ski member 100 over which the inner end rests. The weight is preferably shared with wheel assemblies 102. Wheel assemblies 102 are removably mounted to the inner end of platform assembly 20 through removable pin members 104 passed through hole 108, as best seen in FIG. 14. Wheel assemblies 102 include wheel 106 that supports the weight of apparatus 10.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense.

What is claimed is:

1. An apparatus for storing freight and wheeled vehicles inside containers, said containers having a substantially rectangular floor plan including a floor, a roof, two side walls, an inner end wall, four top frame members and four corner container posts thereby defining outer and inner ends of said containers, comprising:

chassis means comprising a platform member having two long lateral sides and first and second short end sides, a pair of front post means, a pair of rear post means, and base means, said chassis means extending substantially the entire length of said containers and having innermost and outermost ends, and said innermost end including said pair of front post means, the platform member being pivotally mounted to each of said front post means at the first short side of said platform member substantially adjacent to the innermost end of said chassis means for movement about a horizontal axis;

said platform member having four corners extending substantially the entire length and width of said containers so that said platform member can be housed therein, and the second short end side of said platform being pivotally and slidably mounted to said pair of rear post means for vertical movement therealong; wherein said platform member includes a plurality of wheel wells for cooperatively receiving the wheels of said vehicles and further including wheel well covers hingedly mounted to said platform member and cooperatively positioned to be movable between a vertical position and a horizontal position which substantially covers said wheel wells;

said rear post means extending from said floor to said roof of said containers;

locking means for keeping said platform member in a predetermined fixed spaced apart relationship with respect to said floor and wherein said locking means includes means for adjusting the separation of the second short end of the platform member with respect to said floor; and wherein said platform member can be pivotally moved with respect to said front post means and vertically moved with respect to said rear post means so as to provide a substantially horizontal elevated surface for the storage of freight on and below said platform member.

2. The apparatus set forth in claim 1 wherein said platform member further includes means for keeping one of said short ends in a spaced apart relationship with respect to said inner end wall container.

3. The apparatus set forth in claim 2 wherein said front post means being collapsably mounted to said chassis means so that said front post means can be folded inwardly when disengaged from said platform member.

4. The apparatus set forth in claim 3 wherein said platform member includes a plurality of longitudinally extending structural members that rigidly connect with said front and rear post means.

5. The apparatus set forth in claim 4 wherein said platform member includes means for rigidly keeping said platform member in a spaced apart relationship with respect to said side walls.

6. The apparatus set forth in claim 4 wherein said platform member includes means for rigidly keeping said chassis means in a spaced apart relationship with respect to said side walls.

7. The apparatus set forth in claim 6 wherein said platform member includes ski means for slidably supporting part of the weight of said chassis means during transportation from a storage location outside said container to a loaded position inside said container.

* * * * *